July 21, 1942.  L. D. ANDREWS ET AL  2,290,152
FILM DEVELOPING APPARATUS
Filed May 31, 1940  2 Sheets-Sheet 1
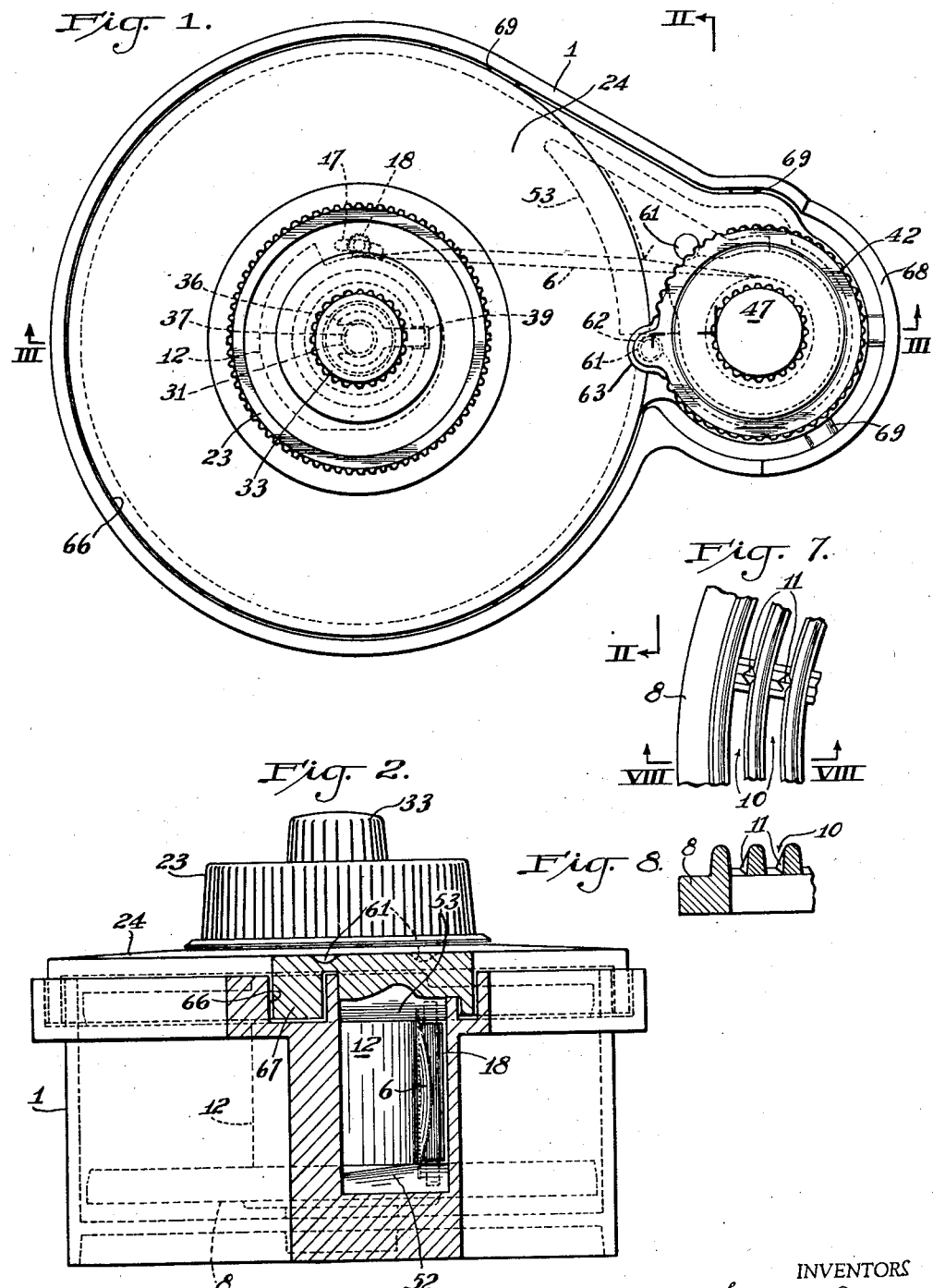
INVENTORS
Lewis D. Andrews
John W. Gillon
BY Brown, Critchlow & Flick
their ATTORNEYS.

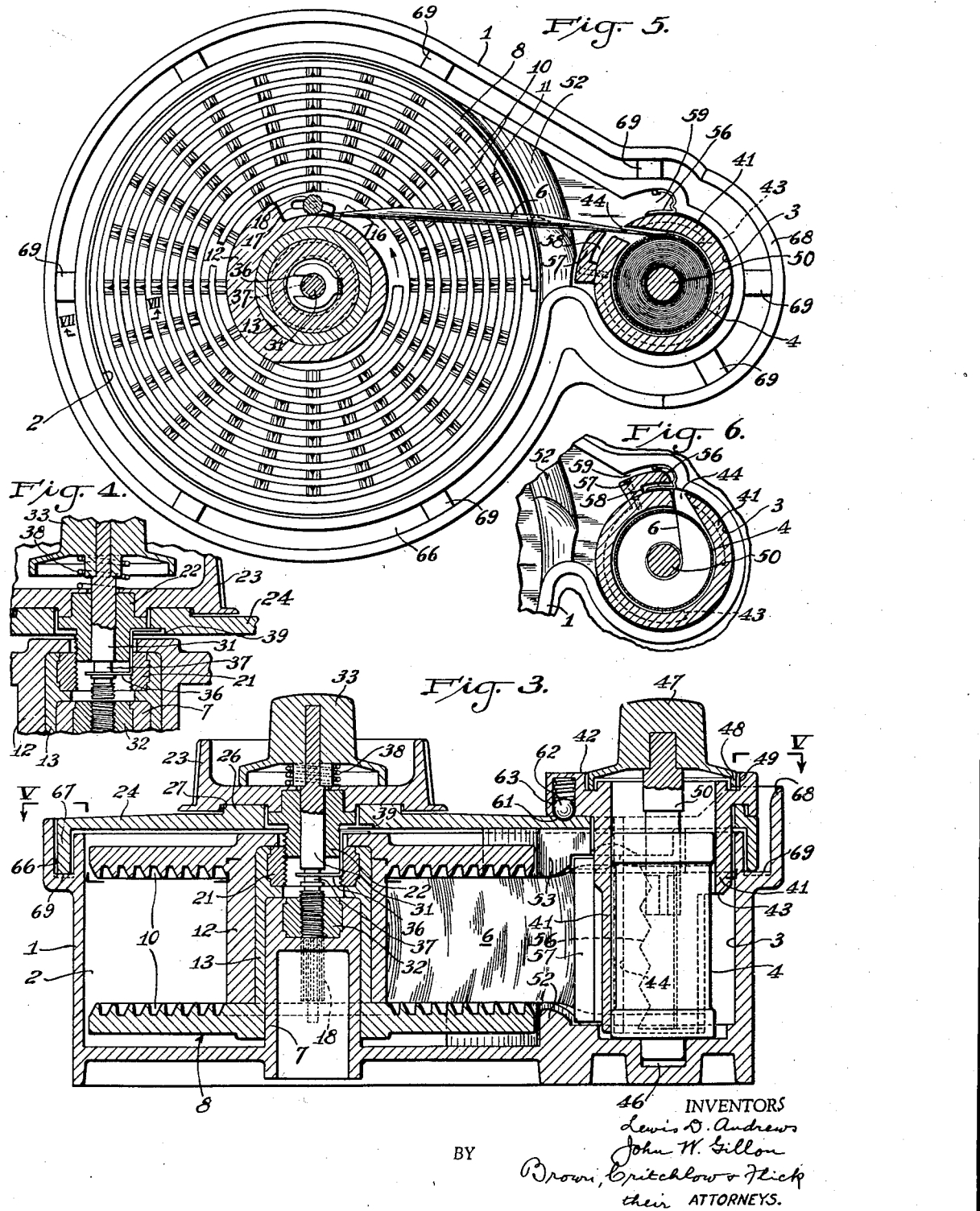

Patented July 21, 1942

2,290,152

UNITED STATES PATENT OFFICE 2,290,152

FILM DEVELOPING APPARATUS

Lewis D. Andrews, St. Marys, Pa., and John W. Gillon, Rochester, N. Y., assignors to Stackpole Carbon Company, St. Marys, Pa., a corporation of Pennsylvania, and Eastman Kodak Company, Rochester, N. Y., a corporation of New Jersey, jointly Application May 31, 1940, Serial No. 338,106

11 Claims. (Cl. 95—90.5)

This invention relates to apparatus for developing strips of photographic film, such as candid camera film and the like, and is especially applicable to a daylight loading developer.

The film developing apparatus disclosed herein is the same as that shown in the copending application of Lewis D. Andrews Serial No. 333,467, filed May 6, 1940, (Patent No. 2,280,113, issued April 21, 1942) but the inventions claimed herein are not claimed in that application. As there shown, the film cartridge and the film-receiving reel are both carried by the cover during loading so that the leading end of the film can be more readily attached to the reel hub than if one or both of these members were disposed in the developing tank at that time. The reel is of the well known type having spiral grooves for receiving the opposite edges of the film which is bowed to permit it to enter the reel between its flanges. Obviously, such a reel will receive the film in its spiral grooves only when it is rotated in a certain direction.

It is among the objects of this invention to provide film developing apparatus of this character in which during loading the reel is locked in a predetermined position relative to the cartridge so that the leading end of the film can easily be attached to the reel and so that the turning of the reel in the correct direction is practically assured. Other objects are to provide such apparatus in which the reel locking means is automatically released when the cover is locked on the tank, and in which the reel locking means is automatically effective after the cover locking means is released.

In accordance with this invention a tank is formed for receiving and rotatably supporting a film cartridge and a film-receiving reel spaced laterally therefrom. The flanges of the reel are provided with spiral grooves into which the edges of the film are led by first bowing it transversely. The leading end of the film is connected to the reel that is turned by means of an operating knob connected thereto and which extends through and overlies the cover. The reel is carried by the cover so that it is removable with it, and the cover also is adapted to rotatably support a film cartridge beside the reel. Means is provided for locking the reel against rotation when the cover is removed from the tank so that the film attaching means on the reel can be positioned in a predetermined fixed position relative to the cartridge. Preferably, the reel and its turning knob have an axial passage therethrough in which a bolt-like member is inserted with its inner end releasably attached to the tank to lock the cover thereon, and the reel lock is applied by the bolt-like member when the cover is unlocked from the tank and is released when the cover is locked on the tank.

The preferred embodiment of the invention is illustrated in the accompanying drawings in which Fig. 1 is a plan view of the film developing apparatus; Fig. 2 is a vertical section thereof taken on the line II—II of Fig. 1; Fig. 3 is a vertical section taken on the line III—III of Fig. 1 and showing the reel locking means unlocked; Fig. 4 is a fragmentary sectional view showing the reel locking means in locking position; Fig. 5 is a horizontal section taken on the line V—V of Fig. 3; Fig. 6 is a fragmentary view showing the film cut-off in cutting position; Fig. 7 is an enlarged fragmentary view of the lower flange of the reel; and Fig. 8 is a vertical section taken on the line VIII—VIII of Fig. 7.

Referring to Figs. 3 and 5 of the drawings, part of the side wall of the tank 1 forms a wall for the major portion of a circular area 2 in which exposed film is developed, as will be described presently. The side wall of the tank at its opposite end forms a wall for the major portion of a smaller circular area 3 adapted to receive a cartridge 4 containing a roll of undeveloped film 6. The bottom of the tank at the center of the developing area is provided with a high cylindrical boss 7 which projects up into a cylindrical opening in the center of a film-developing reel 8 removably disposed in the tank. This boss not only positions the reel in the tank, but also serves as a bearing for it.

The inner face of each flange of the reel is provided with a spiral groove 10 for receiving the edge portions of the film in a well-known manner. The film is held out of engagement with the inner side of the groove by bosses 11 therein (Figs. 7 and 8) so that the edge of the film will be developed along with its body. Each boss presents only an inclined edge to the film and therefore has only a point contact with the film. The reel is made in two parts which are then connected together at their hubs. For this purpose the center of each flange is provided with an inwardly extending cylindrical hub, the upper one 12 being hollow for telescopically receiving the lower one 13. To assure the ends of the spiral grooves in the two flanges being opposite each other when the reel is assembled, the lower end of the upper hub is provided with a notch that fits over an integral key 16 on the lower hub.

The upper and lower flanges are provided beside the hub with a pair of oppositely disposed slots 17 for receiving the ends of a knurled roller 18. When the reel is in the position in which it is ready to start unwinding the film from the cartridge, as shown in Fig. 5, the ends of the slots nearest the film cartridge slant in toward the reel hub. Thus, with the leading end of the film inserted between the roller and hub, and the roller moved in the slots toward the hub, the film is engaged by the roller and pressed tightly against the hub. The roller's grip on the film is increased as the film is pulled.

To lock the two parts of the reel together and also provide means for turning it, the top of the lower hub is provided with an interiorly threaded bushing 21 adapted to threadably receive a cooperating threaded bushing 22 on the bottom of a knob 23, as shown in Fig. 3. This knob overlaps a portion of the tank cover 24 through which bushing 22 extends, and thereby suspends the reel from the cover. Preferably, the cover opening is encircled by a rib 26 that projects into an annular recess 27 in the bottom of the knob so that light cannot enter the tank through the cover opening.

To make it possible to lock the cover on the tank, in order that an undeveloped film can not fall out in case the tank is accidentally upset, the turning knob and its bushing are provided with an axial passage in which a pin 31 may be disposed. The lower end of the pin is threaded so as to screw into a threaded bushing 32 in the top of tank boss 7 that supports the reel. Rigidly mounted on the outer end of this pin is a knob 33 by which it may be screwed into place and which is disposed in the hollow upper portion of the reel-turning knob which it engages.

The portion of the cover over the cartridge-receiving area 3 of the tank is provided with a circular opening in which a hollow cylindrical housing 41 is rotatably mounted. This housing is provided at its upper end with a peripheral flange 42 that rests on the cover in light-trapping relation. The lower portion of the housing is decreased in diameter to provide between it and the side wall of the tank a space with which the interior of the housing communicates through a relatively large opening 43 for a purpose described hereinafter. The housing is adapted to rotatably receive a film cartridge 4, and therefore is provided in its side wall with a vertical slot 44 (Fig. 5) through which the film is drawn from the usual slot in the side of the cartridge. The bottom hub of the cartridge is rotatably mounted in a circular recess 46 in the bottom of the tank, as shown in Fig. 3.

This apparatus is loaded by first removing the tank cover and turning it bottom side up. A film cartridge is then dropped in housing 41 and the leading end of the film pulled through slot 44 and inserted between roller 18 and the reel hub between which it is securely gripped. The cover is then replaced on the tank into which the reel and film cartridge project as shown in Fig. 3. To facilitate the attaching of the film to the reel hub it is desirable that the reel be locked in fixed position during the operation with roller 18 in the position relative to the cartridge shown in Fig. 5. When the film is attached to the reel in such position the operator will see that the reel should be turned to the left, as viewed in Fig. 5, to pull the film into its spiral grooves, and that to turn it in the opposite direction would be to turn it backwardly because it would first form slack in the film and then double it around the roller 18.

To lock the reel for this purpose with film-gripping roller 18 in a predetermined position relative to the film cartridge, hub bushing 21 is provided in its inner surface with a vertical slot in which a key 36 is slidably mounted. The upper end of this key extends laterally over the reel for a short distance, and the lower end is bent inwardly and forked (Fig. 5) so as to straddle a reduced portion 37 of locking pin 31 in a chamber between the bottom of the knob extension and the top of boss 7. When the cover is locked on the tank by pin 31, as in Fig. 3, key 36 is allowed to drop down with its upper end resting on top of the reel and it therefore performs no function, but when the lower end of pin 31 is unscrewed from hub bushing 32 a coil spring 38 encircling pin 31 and compressed between knobs 33 and 23 raises the pin relative to knob 23. As shown in Fig. 4, this causes the shoulder at the bottom of reduced portion 37 to lift the key so that its upper end will project into a recess or slot 39 in the bottom of the cover when the reel is rotated to a predetermined position in which the key and slot register, whereby the key then prevents the reel from rotating relative to the cover until knob 33 is again depressed in locking the cover onto the tank. The reel lock is thus automatically applied and released when the cover is locked on or unlocked from the tank.

During the winding of the film from the cartridge to the reel, after they have been placed in the tank, the top of housing 41 is closed by a rotatable knob 47 having a depending peripheral flange 48 projecting into an annular recess 49 in the top of the housing to prevent light from entering the latter. This knob has a depending split stem 50 that projects into the central opening of the film cartridge and frictionally or mechanically grips it, depending upon the type of cartridge used.

In order to decrease the width of the film so that it can enter the reel between its flanges, the tank and cover are provided with a pair of oppositely disposed integral ribs 52 and 53, respectively, that extend transversely of the film between the cartridge and reel for bowing the film transversely. As shown in Fig. 3, the sides of the ribs next to the cartridge are preferably inclined toward each other and the reel so as to provide a relatively narrow throat through which the film can not pass without bowing. As shown in Fig. 2, the inner end portion of the lower rib's upper surface slants downwardly toward its end. This inclined surface tends to cause the edge of the film to slip toward the adjacent end of the rib and thereby compel it to bow in the opposite direction, which is necessary.

To permit the rear end of the film to be positively severed from the cartridge after it has been unwound therefrom by the reel, a vertical serrated blade 56 is rigidly mounted in the tank at one side of slot 44 in the cartridge housing so that when the housing is turned by its knurled flange 42 it will force the film against the blade and thereby cut it in two close to its rear end. To aid in supporting the film during the cutting operation, housing 41 is provided exteriorly of slot 44 on the side opposite the blade with an elongate vertical member 57 provided with a blade-receiving recess 58. The side wall of the tank is provided with an offset portion 59 for receiving this blade-receiving member when the cartridge housing is turned to film cut-off position, as shown in Fig. 6. When in this position, housing slot 44 is closed by the side of the tank, and light is further prevented from entering the tank through this slot by the blade which is then disposed in the blade-receiving member and thereby helps form a light trap. To hold the cartridge housing in either of its two positions, i. e., operative or cut-off, its flange 42 is provided with a radially projecting boss 63 (Fig. 1) having a downwardly facing opening in which a spring pressed ball 62 is slidably disposed. This ball is adapted to project into either one of two circumferentially spaced depressions 61 in the tank cover.

When the cartridge housing is in film cut-off position knob 47 that closes it may be removed to permit removal of the empty cartridge without light being able to enter the tank through the cartridge. Developing solution is then supplied to the tank by pouring it in through empty housing 41 from which it escapes into the tank through opening 43 which is in the side of the housing farthest from the reel. The film can be agitated in the developing solution by merely turning the reel. The developer is removed from the tank by merely pouring it out of the cartridge housing. However, when the tank is tilted for this purpose some of the developer will leak out around the cover. To take care of this leakage the top of the entire tank is surrounded by a deep channel 66 into which cover flange 67 extends, and the outer wall of the channel is elevated at the pouring end of the tank to provide a pouring spout 68. This spout pours a stream of developer from channel 66 into the stream issuing from the cartridge housing, whereby only one stream leaves the tank as a whole. Filling and emptying the tank can be speeded up by providing the bottom of channel 66 with bosses 69 that space the bottom of the cover flange from the tank. This space forms an air vent while the tank is being filled, and an outlet when it is being emptied. The washing water is introduced into the tank and removed therefrom in the same manner as the developer.

According to the provisions of the patent statutes, we have explained the principle and mode of operation of our invention, and have illustrated and described what we now consider to represent its best embodiment. However, we desire to have it understood that, within the scope of the appended claims, the invention may be practiced otherwise than as specifically illustrated and described.

We claim:

1. A film developer comprising a tank provided with communicating chambers, a removable cover for the tank, a film cartridge housing depending from the cover into one of said chambers, a film-receiving reel rotatably carried by the cover and disposed in the other of said chambers, means on the reel for attaching the leading end of a film from a cartridge in said housing, and releasable means automatically operative when the cover is removed from the tank for locking the reel against rotation when said attaching means is in film attaching position relative to the cartridge housing.

2. A film developer comprising a tank provided with communicating chambers, a removable cover for the tank, a film cartridge housing depending from the cover into one of said chambers, a film-receiving reel rotatably carried by the cover and disposed in the other of said chambers, means on the reel hub for attaching thereto the leading end of a film from a cartridge in said housing, the inner faces of the reel flanges being provided with spiral grooves for receiving the edges of said film, and releasable reel-positioning means for locking the reel against rotation with said film attaching means in film threading position relative to the cartridge housing.

3. A film developer comprising a tank provided with communicating chambers, a removable cover for the tank, a film cartridge housing depending from the cover into one of said chambers, a film-receiving reel rotatably carried by the cover and disposed in the other of said chambers, means on the reel for attaching the leading end of a film from a cartridge in said housing, the bottom of the cover being provided with a recess, a locking key carried by the reel, and means for moving said key into said recess to lock the reel against rotation, said key and recess being so positioned relative to the reel and cartridge housing as to lock the reel with said attaching means in film attaching position relative to said housing.

4. A film developer comprising a tank, a removable cover for the tank adapted to rotatably carry a film cartridge adjacent its underside, a film-receiving reel rotatably carried by the cover beside said cartridge, means on the reel for attaching the leading end of a film from the cartridge, a turning member above the cover provided with an extension projecting through the cover and connected to the center of the reel, said member and extension being provided with an axial opening therethrough and the reel having a chamber at the inner end of said opening, a locking key overlying the reel and extending into said chamber, said key being movable only axially of the reel, and means extending through said opening and connected to the key in said chamber for raising the key, the bottom of the cover being provided with an opening for receiving the raised key to lock the reel against rotation, said key-raising means being depressable to release the key from said recess.

5. A film developer comprising a tank, a removable cover for the tank adapted to rotatably carry a film cartridge adjacent its underside, a film-receiving reel rotatably carried by the cover beside said cartridge, means on the reel for attaching the leading end of a film from the cartridge, releasable means for locking the reel against rotation with said attaching means in film attaching position relative to the cartridge, means for locking the cover on the tank, and means automatically releasing said reel lock when said cover lock is applied.

6. A film developer comprising a tank provided with an upstanding cylindrical boss on its bottom, a film-receiving reel having a hollow hub rotatably mounted on said boss, a cover for the tank provided with an opening above said hub and adapted to rotatably carry a film cartridge adjacent its underside, a turning knob overlying the cover and having an extension projecting through said cover opening and connected to said hub, said knob and extension being provided with an axial opening therethrough, a locking member extending down through said axial opening into detachable engagement with said boss for locking the cover on the tank, means on the reel for attaching the leading end of film from said cartridge, and means actuated when said locking member is released from said boss for locking the reel against rotation with said attaching means in film attaching position relative to the cartridge.

7. A film developer comprising a tank provided with an upstanding cylindrical boss on its bottom, a film-receiving reel having a hollow hub rotatably mounted on said boss, a cover for the tank provided with an opening above said hub and adapted to rotatably carry a film cartridge adjacent its underside, a turning knob overlying the cover and having an extension projecting through said cover opening and connected to said hub, said knob and extension being provided with an axial opening therethrough, a locking member extending down through said axial opening into detachable engagement with said boss for locking the cover on the tank, means on the reel for attaching the leading end of film from said cartridge, means biasing said locking member upwardly relative to said boss, and means actuated by said upwardly biased locking member when it is released from said boss for holding the reel against rotation with said attaching means in film attaching position relative to the cartridge.

8. A film developer comprising a tank provided with an upstanding cylindrical boss on its bottom, a film-receiving reel having a hollow hub rotatably mounted on said boss, a cover for the tank provided with an opening above said hub and adapted to rotatably carry a film cartridge adjacent its underside, a turning knob overlying the cover and having an extension projecting through said cover opening and connected to said hub, said knob and extension being provided with an axial opening therethrough, a locking member extending down through said axial opening into detachable engagement with said boss for locking the cover on the tank, means on the reel for attaching the leading end of the film from said cartridge, means biasing said locking member upwardly relative to said boss, and a key slidably mounted between said knob extension and hub with its lower end connected to said locking member for axial movement therewith, the lower surface of the cover being provided with a recess adjacent its opening, and the upper end of said key projecting into said recess when the upwardly biased locking member is released from said boss whereby to hold the reel against rotation with said attaching means in film attaching position relative to the cartridge.

9. A film developer comprising a tank, a film-receiving reel having a hollow hub rotatably mounted in said tank, a cover for the tank provided with an opening above said hub and adapted to rotatably carry a film cartridge adjacent its underside, a turning knob overlying the cover and having an extension projecting through said cover opening and connected to said hub, said knob and extension being provided with an axial opening therethrough, a pin rotatably disposed in said axial opening with its lower end detachably connected to said tank, a turning knob connected to the upper end of said pin, means on the reel for attaching the leading end of film from said cartridge, a coil spring compressed between said knobs for biasing said pin upwardly, and a key slidably mounted between said knob extension and hub with its lower end connected to the lower end portion of said pin for axial movement therewith, the lower surface of the cover being provided with a recess adjacent its opening, and the upper end of said key projecting into said recess when the upwardly biased locking member is released from said tank whereby to hold the reel against rotation with said attaching means in film attaching position relative to the cartridge.

10. A film developer comprising a tank adapted to rotatably receive a film cartridge, a removable cover for the tank, film cartridge positioning means in the tank for rotatably receiving the film cartridge, means defining a path for the unwinding of film from said cartridge, a reel rotatably mounted in the tank beside said cartridge-positioning means for receiving film from the cartridge, means on the reel for attaching the leading end of said film, releasable reel-positioning means for locking the reel with said film attaching means in predetermined film attaching position relative to said path-defining means, and means operable in response to attachment of the cover to the tank for automatically releasing said reel-locking means.

11. A film developer comprising a tank adapted to rotatably receive a film cartridge, a removable cover for the tank, film cartridge carrying means depending from the cover into the tank for rotatably connecting the film cartridge to the cover, a reel rotatably mounted on the underside of the cover beside said means for receiving film from the cartridge, means on the reel for attaching the leading end of said film, means for turning the reel for winding the film thereon, the inner faces of the reel flanges being provided with spiral grooves for receiving the edges of the film, and releasable reel-positioning means for locking the reel with said film attaching means in predetermined film attaching position relative to the cover and cartridge-carrying means while the reel and cartridge-carrying means are supported by the cover outside of the tank.

LEWIS D. ANDREWS.
JOHN W. GILLON.